(12) United States Patent  (10) Patent No.: US 9,762,642 B2
Wang et al.  (45) Date of Patent: Sep. 12, 2017

(54) STORING AND TRANSMITTING CONTENT FOR DOWNLOADING AND STREAMING

(71) Applicant: Futurewei Technologies, Inc., Plano, TX (US)

(72) Inventors: Xin Wang, Rancho Palos Verdes, CA (US); Yongliang Liu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 682 days.

(21) Appl. No.: 14/157,294

(22) Filed: Jan. 16, 2014

(65) Prior Publication Data

US 2014/0201334 A1  Jul. 17, 2014

Related U.S. Application Data

(60) Provisional application No. 61/753,291, filed on Jan. 16, 2013.

(51) Int. Cl.
G06F 15/16 (2006.01)
H04L 29/06 (2006.01)
H04N 21/442 (2011.01)
H04N 21/63 (2011.01)
H04N 21/845 (2011.01)
H04L 29/08 (2006.01)

(52) U.S. Cl.
CPC ........ H04L 65/605 (2013.01); H04L 65/4084 (2013.01); H04L 67/02 (2013.01); H04N 21/44209 (2013.01); H04N 21/632 (2013.01); H04N 21/8456 (2013.01); H04L 67/104 (2013.01)

(58) Field of Classification Search
CPC .................................... H04L 65/4092
USPC .......................................................... 709/219
See application file for complete search history.

(56) References Cited

U.S. PATENT DOCUMENTS

2012/0090036 A1* 4/2012 Kang ...................... G06F 21/10 726/27
2013/0007814 A1 1/2013 Cherian et al.
2013/0117413 A1 5/2013 Kaneko et al.
2013/0246643 A1* 9/2013 Luby ................ H04N 21/23439 709/231

(Continued)

FOREIGN PATENT DOCUMENTS

EP 2597869 A1 5/2013
JP 11353248 A 12/1999

(Continued)

OTHER PUBLICATIONS

Foreign Communication From A Counterpart Application, European Application No. 14703993.7, Extended European Search Report dated Oct. 2, 2015, 5 pages.
"Information technology—Dynamic adaptive streaming over HTTP (DASH)—Part 1: Media presentation description and segment formats", International Standard, ISO/IEC JTC 1/SC 29, ISO/IEC 23009-1:2012(E), Jan. 5, 2012, 133 pgs.

(Continued)

Primary Examiner — Hamza Algibhah
(74) Attorney, Agent, or Firm — Conley Rose, P.C.

(57) ABSTRACT

A method implemented by a first client device, the method comprising receiving a media presentation description (MPD) for a media content from a streaming server, receiving a plurality of segments for the media content from one or more streaming servers, and packaging the MPD and at least part of the received segments such that the packaged segments are accessible by a second client device through the packaged MPD.

25 Claims, 15 Drawing Sheets

(56) References Cited

U.S. PATENT DOCUMENTS

| | | | |
|---|---|---|---|
| 2014/0032849 A1* | 1/2014 | De Vleeschauwer | G06F 17/30902 711/133 |
| 2014/0096271 A1* | 4/2014 | Wang | G06F 21/10 726/30 |
| 2014/0101118 A1* | 4/2014 | Dhanapal | H04N 21/251 707/695 |
| 2015/0012956 A1* | 1/2015 | Kim | H04N 21/2381 725/110 |
| 2015/0172340 A1* | 6/2015 | Lohmar | H04N 21/2401 709/219 |
| 2015/0172353 A1* | 6/2015 | Hannuksela | H04N 21/47217 709/219 |
| 2015/0172738 A1* | 6/2015 | Mitsuhashi | H04N 21/26258 725/25 |
| 2015/0256981 A1* | 9/2015 | Chen | H04L 65/4084 370/312 |
| 2015/0288530 A1* | 10/2015 | Oyman | H04W 56/00 370/312 |

FOREIGN PATENT DOCUMENTS

| | | |
|---|---|---|
| WO | 2012011450 A1 | 1/2012 |
| WO | 2012099400 A2 | 7/2012 |
| WO | 2012138909 A1 | 10/2012 |
| WO | 2013003793 A1 | 1/2013 |

OTHER PUBLICATIONS

Lederer, S., et al., "Towards Peer-Assisted Dynamic Adaptive Steaming over HTTP," Packet Video Workshop (PV), Proceedings of 2012 IEEE 19th International Packet Video Workshop, Munich, Germany, May 10-11, 2012, pp. 161-166.
Foreign Communication From A Counterpart Application, PCT Application No. PCT/US2014/011919, Invitation to Pay Additional Fees dated Mar. 31, 2014, 6 pages.
Partial English Translation and Abstract of Japanese Patent Application No. JPH11353248, Aug. 10, 2016, 27 pages.
Foreign Communication From A Counterpart Application, Japanese Application No. 2015-544220, Japanese Office Action dated Jul. 5, 2016, 4 pages.
Foreign Communication From A Counterpart Application, Japanese Application No. 2015-544220, English Translation of Japanese Office Action dated Jul. 5, 2016, 5 pages.
Xin Wang, et al., "Segment Authentication for Dynamic Adaptive Streaming," Assignment to Futurewei Technologies, Inc, U.S. Appl. No. 13/731,864, Recorded May 14, 2013 at Reel 030407; Frame 0833, 4 pages.
Xin Wang, et al., "Segment Authentication for Dynamic Adaptive Streaming," Assignment to Futurewei Technologies, Inc., U.S. Appl. No. 14/157,294, Recorded Feb. 11, 2014 at Reel 032189; Frame 0655, 3 pages.

* cited by examiner

300

```
<?xml version="1.0" encoding="UTF-8"?>
<MPD
 xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011"
 type="static"
 mediaPresentationDuration="PT3256S"
 minBufferTime="PT1.2S"
 profiles="urn:mpeg:dash:profile:isoff-on-demand:2011">
 <BaseURL>http://cdn1.example.com/</BaseURL>
 <BaseURL>http://cdn2.example.com/</BaseURL>
 <Period>
  <!--Audio -->
  <AdaptationSet mimeType="audio/mp3" codecs="mp3a.0x40" lang="en"
subsegmentAlignment="true">
    <Representation id="1" bandwidth="64000">
     <BaseURL>7657412348.mp3</BaseURL>    ←—— 312
        <SegmentData>A7B8C9D0E1......</SegmentData>   ←—— 310
    </Representation>
    <Representation id="2" bandwidth="32000">
     <BaseURL>3463646346.mp3</BaseURL>  ←—— 330
    </Representation>
  </AdaptationSet>
  <!-- Video -->
  <AdaptationSet mimeType="video/mp4" codecs="avc1.4d0228"
subsegmentAlignment="true">
    <Representation id="3" bandwidth="1024000" width="640" height="480">
      <BaseURL>562465736.mp4</BaseURL>  ←—— 340
    </Representation>
    <Representation id="4" bandwidth="2048000" width="1280" height="720">
      <BaseURL>23536745734.mp4</BaseURL> ←—— 322
        <SegmentData>C7B8C9D0E1......</SegmentData>  ←—— 320
    </Representation>
  </AdaptationSet>
 </Period>
</MPD>
```

*FIG. 3*

```
<?xml version="1.0" encoding="UTF-8"?>
<!DOCTYPE Resources[
    <!ENTITY SegmentData1 "A7B8C9D0E1......">    ← 410
    <!ENTITY SegmentData4 "D7B8C9D0E1......">    ← 420
]>
<MPD
 xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011"
 type="static"
 mediaPresentationDuration="PT3256S"
 minBufferTime="PT1.2S"
 profiles="urn:mpeg:dash:profile:isoff-on-demand:2011">
 <BaseURL>http://cdn1.example.com/</BaseURL>
 <BaseURL>http://cdn2.example.com/</BaseURL>
 <Period>
  <!--Audio -->
  <AdaptationSet mimeType="audio/mp3" codecs="mp3a.0x40" lang="en"
subsegmentAlignment="true">
    <Representation id="1" bandwidth="64000">
     <BaseURL>7657412348.mp3</BaseURL>
        <SegmentData>&SegmentData1</SegmentData>    ← 430
    </Representation>
    <Representation id="2" bandwidth="32000">
     <BaseURL>3463646346.mp3</BaseURL>
    </Representation>
  </AdaptationSet>
  <!-- Video -->
  <AdaptationSet mimeType="video/mp4" codecs="avc1.4d0228"
subsegmentAlignment="true">
    <Representation id="3" bandwidth="1024000" width="640" height="480">
     <BaseURL>562465736.mp4</BaseURL>
    </Representation>
    <Representation id="4" bandwidth="2048000" width="1280" height="720">
     <BaseURL>23536745734.mp4</BaseURL>
        <SegmentData>&SegmentData4</SegmentData>    ← 440
    </Representation>
  </AdaptationSet>
 </Period>
</MPD>
```

```xml
<?xml version="1.0" encoding="UTF-8"?>
<LocalURIs xmlns:xlink="http://www.w3.org/1999/xlink">
<MPD
 xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011"
 type="static"
 mediaPresentationDuration="PT3256S"
 minBufferTime="PT1.2S"
 profiles="urn:mpeg:dash:profile:isoff-on-demand:2011">
 <BaseURL>http://cdn1.example.com/</BaseURL>
 <Period>
  <!--Audio -->
  <AdaptationSet mimeType="audio/mp3" codecs="mp3a.0x40" lang="en"
subsegmentAlignment="true">
   <Representation id="1" bandwidth="64000">
    <BaseURL>7657412348.mp3</BaseURL>
      <LocalURI xlink:type="simple"
        xlink:href="#sid1"></LocalURI>           } 730
   </Representation>
   <Representation id="2" bandwidth="32000">
    <BaseURL>3463646346.mp3</BaseURL>
   </Representation>
  </AdaptationSet>
  <!-- Video -->
  <AdaptationSet mimeType="video/mp4" codecs="avc1.4d0228"
subsegmentAlignment="true">
   <Representation id="3" bandwidth="1024000" width="640" height="480">
    <BaseURL>562465736.mp4</BaseURL>
   </Representation>
   <Representation id="4" bandwidth="2048000" width="1280" height="720">
    <BaseURL>23536745734.mp4</BaseURL>
      <LocalURI xlink:type="simple"
        xlink:href="#sid4"> </LocalURI>          } 740
   </Representation>
  </AdaptationSet>
 </Period>                                    710
  <Resources>
     <SegmentData id="sid1">A7B8C9D0E1......<SegmentData>   } 702
     <SegmentData id="sid4">D7B8C9D0E1......<SegmentData>
  </Resources>
</MPD>                                         720
```

*FIG. 7*

```xml
<?xml version="1.0" encoding="UTF-8"?>
<MPD
 xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011"
 type="static"
 mediaPresentationDuration="PT3256S"
 minBufferTime="PT1.2S"
 profiles="urn:mpeg:dash:profile:isoff-on-demand:2011">
 <BaseURL>http://cdn1.example.com/</BaseURL>
 <BaseURL>http://cdn2.example.com/</BaseURL>
 <Period>
   <!--Audio -->
   <AdaptationSet mimeType="audio/mp3" codecs="mp3a.0x40" lang="en" subsegmentAlignment="true">
     <Representation id="1" bandwidth="64000">
       <BaseURL>7657412348.mp3</BaseURL>
         <LocalURI><Path="Resources/sid1 "/> </LocalURI>   ← 830
       </Representation>
     <Representation id="2" bandwidth="32000">
       <BaseURL>3463646346.mp3</BaseURL>
     </Representation>
   </AdaptationSet>
   <!-- Video -->
   <AdaptationSet mimeType="video/mp4" codecs="avc1.4d0228" subsegmentAlignment="true">
     <Representation id="3" bandwidth="1024000" width="640" height="480">
       <BaseURL>562465736.mp4</BaseURL>
     </Representation>
     <Representation id="4" bandwidth="2048000" width="1280" height="720">
       <BaseURL>23536745734.mp4</BaseURL>
         <LocalURI><Path="Resources/sid4"/> </LocalURI>   ← 840
     </Representation>
   </AdaptationSet>
 </Period>
   <Resources>
       <SegmentData id="sid1">A7B8C9D0E1......<SegmentData>
       <SegmentData id="sid4">D7B8C9D0E1......<SegmentData>
   </Resources>
</MPD>
```

FIG. 8

```
<?xml version="1.0" encoding="UTF-8"?>
<MPD Extension>
 <OriginalMPD>......</OriginalMPD>                    ←—— 910
 <UpdatedMPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011"
type="static"
mediaPresentationDuration="PT3256S"
minBufferTime="PT1.2S"
profiles="urn:mpeg:dash:profile:isoff-on-demand:2011">
 <BaseURL>http://cdn1.example.com/</BaseURL>
 <BaseURL>http://cdn2.example.com/</BaseURL>
 <Period>
   <!--Audio -->
   <AdaptationSet mimeType="audio/mp3" codecs="mp3a.0x40" lang="en"
subsegmentAlignment="true">
     <Representation id="1" bandwidth="64000">
       <BaseURL>7657412348.mp3</BaseURL>
         <SegmentData>A7B8C9D0E1......</SegmentData>
     </Representation>
     <Representation id="2" bandwidth="32000">
       <BaseURL>3463646346.mp3</BaseURL>
     </Representation>
   </AdaptationSet>
   <!-- Video -->
   <AdaptationSet mimeType="video/mp4" codecs="avc1.4d0228"
subsegmentAlignment="true">
     <Representation id="3" bandwidth="1024000" width="640" height="480">
       <BaseURL>562465736.mp4</BaseURL>
     </Representation>
     <Representation id="4" bandwidth="2048000" width="1280" height="720">
       <BaseURL>23536745734.mp4</BaseURL>
         <SegmentData>C7B8C9D0E1......</SegmentData>
     </Representation>
   </AdaptationSet>
 </Period>
 </UpdatedMPD>
</MPD Extension>
```

*FIG. 9*

From: <XXXXXXXX>
Subject: =?XXXXXXXXX?=
Date: Thu, 29 Nov 2012 10:47:53 +0800
MIME-Version: 1.0
Content-Type: multipart/related;
    type="application/xml";
    boundary="----=_NextPart_000_0003_01CDCE1E.FC0E2AA0"

------=_NextPart_000_0003_01CDCE1E.FC0E2AA0
Content-Type: "application/xml";
    charset="UTF-8"
Content-Transfer-Encoding: quoted-printable
Content-Location: http://MPDserver.com

*FIG. 10A*

```xml
<?xml version="1.0" encoding="UTF-8"?>
<MPD
 xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011"
 type="static"
 mediaPresentationDuration="PT3256S"
 minBufferTime="PT1.2S"
 profiles="urn:mpeg:dash:profile:isoff-on-demand:2011">
 <BaseURL>http://cdn1.example.com/</BaseURL>
 <BaseURL>http://cdn2.example.com/</BaseURL>
 <Period>
   <!--Audio -->
   <AdaptationSet mimeType="audio/mp3" codecs="mp3a.0x40" lang="en" subsegmentAlignment="true">
     <Representation id="1" bandwidth="64000">
       <BaseURL>7657412348.mp3</BaseURL>      <-- 1032
     </Representation>
     <Representation id="2" bandwidth="32000">
       <BaseURL>3463646346.mp3</BaseURL>
     </Representation>
   </AdaptationSet>
   <!-- Video -->
   <AdaptationSet mimeType="video/mp4" codecs="avc1.4d0228" subsegmentAlignment="true">
     <Representation id="3" bandwidth="1024000" width="640" height="480">
       <BaseURL>562465736.mp4</BaseURL>
     </Representation>
     <Representation id="4" bandwidth="2048000" width="1280" height="720">
       <BaseURL>23536745734.mp4</BaseURL>    <-- 1034
     </Representation>
   </AdaptationSet>
 </Period>
</MPD>
```

```
------=_NextPart_000_0003_01CDCE1E.FC0E2AA0
Content-Type: audio/mp3
Content-Transfer-Encoding: base64
Content-Location: http://cdn1.example.com/7657412348.mp3   ←—— 1010

4AAQSkZJRgABAgAAZABkAAD......

------=_NextPart_000_0003_01CDCE1E.FC0E2AA0
Content-Type: video/mp4
Content-Transfer-Encoding: base64
Content-Location: http://cdn1.example.com/23536745734.mp4  ←—— 1020

CAAQSkZJRgABAgAAZABkbbE......
------=_NextPart_000_0003_01CDCE1E.FC0E2AA0
```

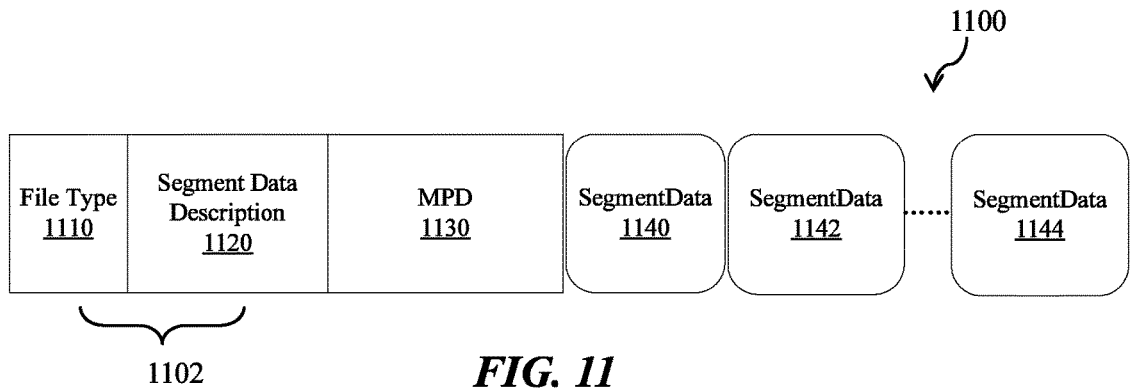

1100

| File Type 1110 | Segment Data Description 1120 | MPD 1130 | SegmentData 1140 | SegmentData 1142 | ...... | SegmentData 1144 |

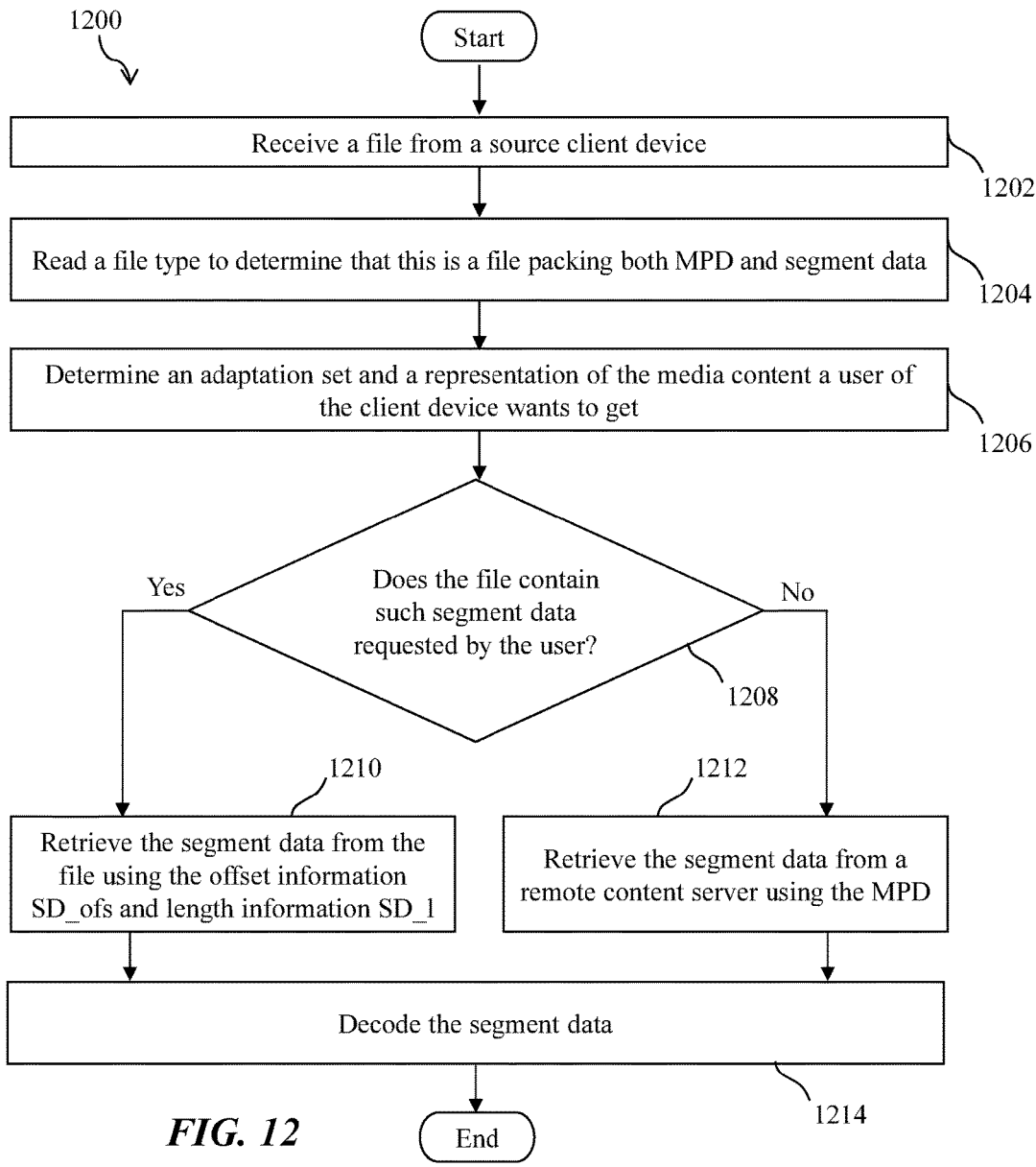

```xml
<?xml version="1.0" encoding="UTF-8"?>
<MPD
  xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011"
  type="static"
  mediaPresentationDuration="PT3256S"
  minBufferTime="PT1.2S"
  profiles="urn:mpeg:dash:profile:isoff-on-demand:2011">
  <BaseURL>http://cdn1.example.com/</BaseURL>
  <BaseURL>http://cdn2.example.com/</BaseURL>
  <Period>
    <!--Audio -->
    <AdaptationSet mimeType="audio/mp3" codecs="mp3a.0x40" lang="en" subsegmentAlignment="true">
      <Representation id="1" bandwidth="64000">
        <BaseURL>7657412348.mp3</BaseURL>
        <LocalURI>
           <Path xlink:type="simple"
             xlink:href="http://xxxx.com/resources.xml#sid1">
        </LocalURI>
      </Representation>
      <Representation id="2" bandwidth="32000">
        <BaseURL>3463646346.mp3</BaseURL>
      </Representation>
    </AdaptationSet>
    <!-- Video -->
    <AdaptationSet mimeType="video/mp4" codecs="avc1.4d0228" subsegmentAlignment="true">
      <Representation id="3" bandwidth="1024000" width="640" height="480">
        <BaseURL>562465736.mp4</BaseURL>
      </Representation>
      <Representation id="4" bandwidth="2048000" width="1280" height="720">
        <BaseURL>23536745734.mp4</BaseURL>
        <LocalURI>
           <Path xlink:type="simple"
             xlink:href="http://xxxx.com/resources.xml#sid4">
        </LocalURI>

</Representation>
    </AdaptationSet>
  </Period>
</MPD>
```

FIG. 13B

STORING AND TRANSMITTING CONTENT FOR DOWNLOADING AND STREAMING

CROSS-REFERENCE TO RELATED APPLICATIONS

The present application claims priority to U.S. Provisional Patent Application No. 61/753,291 filed Jan. 16, 2013 by Xin Wang et al. and entitled "System and Method for Storing and Transmitting Content for Download and Streaming", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver media contents to various client devices such as televisions, notebook computers, and mobile handsets. The media content provider may support a plurality of media encoder and/or decoders (codecs), media players, video frame rates, spatial resolutions, bit-rates, video formats, or combinations thereof. A media content may be converted from a source or original representation to various other representations to suit the different user devices.

A media content may comprise a media presentation description (MPD) and a plurality of segments. The MPD may be an extensible markup language (XML) file describing the media content, such as its various representations, uniform resource locator (URL) addresses, and other characteristics. For example, the media content may comprise several media components (e.g. audio, video, and text), each of which may have different characteristics that are specified in the MPD. Each media component comprises a plurality of segments containing the parts of actual media content, and the segments may be stored collectively in a single file or individually in multiple files. Each segment may contain a pre-defined byte size (e.g., 1,000 bytes) or an interval of playback time (e.g., 2 or 5 seconds) of the media content.

Depending on the application, the media content may be divided into various hierarchies. For example, the media content may comprise multiple periods, where a period is a time interval relatively longer than a segment. For instance, a television program may be divided into several 5-minute-long program periods, which are separated by several 2-minute-long commercial periods. Further, a period may comprise one or multiple adaptation sets (AS). An AS may provide information about one or multiple media components and its/their various encoded representations. For instance, an AS may contain different bit-rates of a video component of the media content, while another AS may contain different bit-rates of an audio component of the same media content. A representation may be an encoded alternative of a media component, varying from other representations by bit-rate, resolution, number of channels, or other characteristics, or combinations thereof. Each representation comprises multiple segments, which are media content chunks in a temporal sequence. Moreover, sometimes to enable downloading a segment in multiple parts, sub-segments may be used each having a specific duration and/or byte size. One skilled in the art will understand the various hierarchies that can be used to deliver a media content.

In adaptive streaming, when a media content is delivered to a client or user device, the user device may select appropriate segments dynamically based on a variety of factors, such as network conditions, device capability, and user choice. Adaptive streaming may include various technologies or standards implemented or being developed, such as Dynamic Adaptive Streaming over Hypertext Transfer Protocol (HTTP) (DASH), HTTP Live Streaming (HLS), or Internet Information Services (IIS) Smooth Streaming. For example, the user device may select a segment with the highest quality (e.g., resolution or bit-rate) possible that can be downloaded in time for playback without causing stalling or rebuffering events in the playback. Thus, the user device may seamlessly adapt its media content playback to changing network conditions.

Another way of content delivery involves downloading, which may be used to partially meet personalized requirements of subscribers. DASH may allow a subscriber to have a better experience. For example, the subscriber's device can retrieve media content with high quality when the network connectivity is fast, and switch to media content with low quality to continue playing content when the network connectivity worsens. In existing schemes, segments for a media content may be thrown away after they are retrieved and decoded by a client device. Accordingly, the segments may not be effectively used for future purposes. For example, if the client device decides to replay the media content, streaming may need to start from scratch, which may waste network resources.

SUMMARY

In one embodiment, the disclosure includes a method implemented by a first client device, the method comprising receiving a media presentation description (MPD) for a media content from a streaming server, receiving a plurality of segments for the media content from one or more streaming servers, and packaging the MPD and at least part of the received segments such that the packaged segments are accessible by a second client device through the packaged MPD.

In another embodiment, the disclosure includes an apparatus comprising a receiver configured to receive an MPD that describes a media content and a plurality of segments for the media content, a processor coupled to the receiver and configured to play the media content using the received segments, and a memory coupled to the processor and configured to store the MPD and at least part of the received segments, wherein each of the stored segment is retrievable through the stored MPD, wherein the processor is further configured to replay the media content using at least some of the stored segments.

In yet another embodiment, the disclosure includes a method implemented by a second client device for obtaining a media content that comprises a plurality of segments, the method comprising obtaining a first portion of the segments from a first client device acting as a source device, obtaining a second portion of the segments from a streaming server, and playing the media content using the first portion of the segments and the second portion of the segments.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates an examplary implementation, in which an MPD file contains segment data directly.

FIG. 4 illustrates another examplary implementation, in which both MPD and segment data belong to a same file.

FIG. 7 illustrates yet another examplary implementation, which links stored segment data to corresponding segment elements by using XML features.

FIG. 8 illustrates yet another examplary implementation, which links stored segment data to corresponding segment elements by using full paths.

FIG. 9 illustrates yet another examplary implementation, which generates an MPD extension.

FIGS. 10A and 10B illustrate yet another examplary implementation, which packages MPD and segment data as independent parts of a file.

FIG. 11 illustrates yet another examplary implementation, which packages an MPD and segment data into a file.

FIG. 12 is a flowchart of an embodiment of a file processing method.

FIGS. 13A and 13B illustrate yet another examplary implementation, which packages MPD and segment data as two separate files.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure teaches embodiments to enable a client device to further utilize media segments, once the media segments have been obtained from a content provider or server. The segments may be further used for replaying the media content on the client device, sharing with a second client device, or both. Specifically, an MPD and segments received by the client device for a first time may be packaged or stored such that the packaged segments may be accessible by the second client device via the MPD. The MPD and the segments may be stored as a single file or as separate associated files. Single file storage may take various forms (e.g., with MPD directly containing segments or linking segments to elements of the MPD) and may allow the second device to download the file without going to a remote content provider. Multiple file storage may allow the second device to stream at least part of the media content from the source device.

Figure 1:
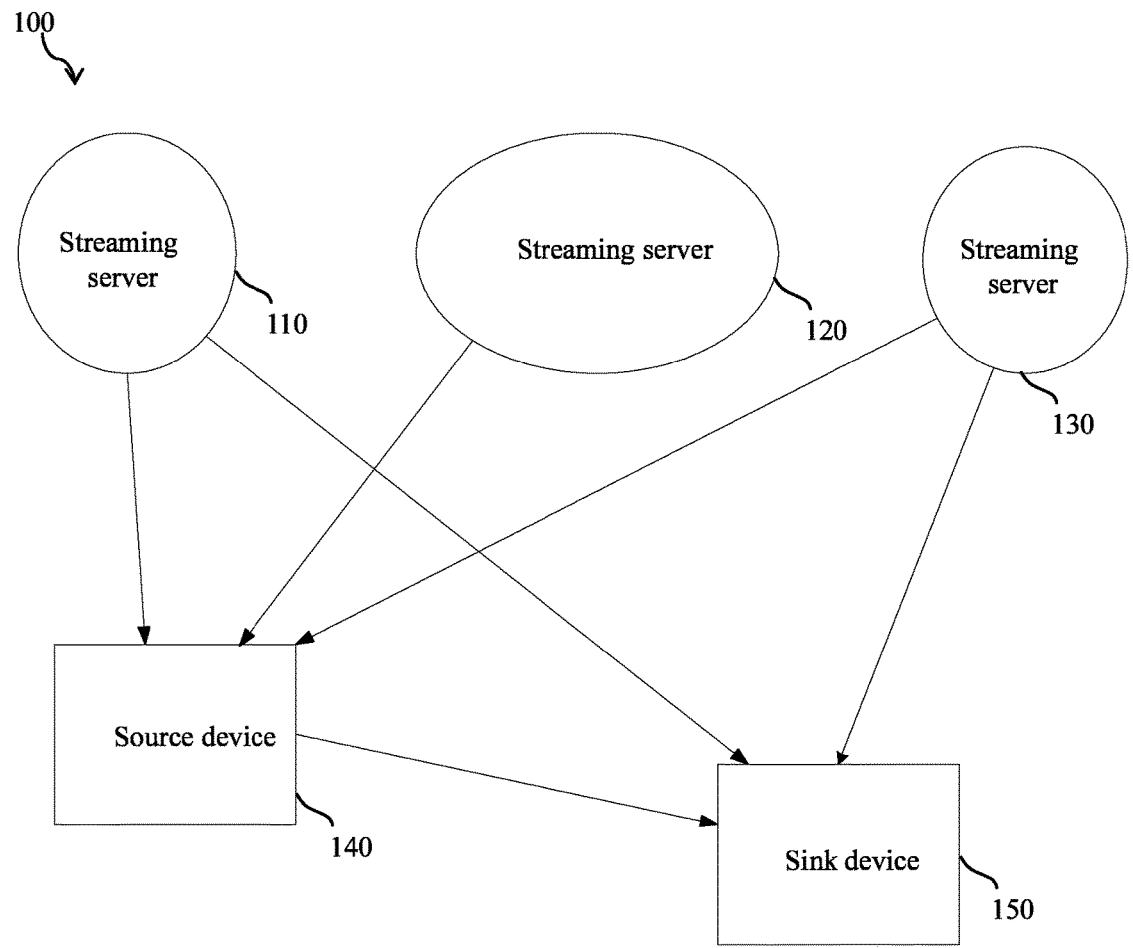
FIG. 1 is a schematic diagram of an embodiment of a content delivery system.

FIG. 1 is a schematic diagram of an embodiment of a content delivery system 100, which may comprise one or more media streaming servers and streaming clients. For example, FIG. 1 illustrates three streaming servers 110, 120, and 130, a source device 140, and a sink device 150, each interconnected to other devices. The source device 140 and the sink device 150 may both be streaming clients that obtain (via downloading or streaming) media contents from one or more of the servers 110-130. A media content may take any viable form such as video, audio, text, or combinations thereof. The media content may contain any applicable type of information, such as movie, music, and/or electronic publication, etc. Moreover, after obtaining media contents from the servers 110-130, the source device 140 may further share the obtained media content with the sink device 150. In this sense, the source device 140 acts as a streaming server to the sink device 150, which may obtain at least part of a media content from the source device 140.

The content delivery system 100 may implement any suitable content delivery scheme or method, such as a DASH scheme. The streaming client may be a program or application implemented in an operating system of a user device such as the source device 140 or the sink device 150, or it may be a web client accessed in a web platform.

The streaming server 110 (same applies to other streaming servers) may be implemented as any suitable type of server such as an HTTP server, where media contents may be generated or prepared by a streaming media preparation unit. The media preparation unit may be located in the HTTP server or elsewhere (e.g., in a content provider). The streaming server 110 may be part of a content provider or may be a node in a content distribution network (CDN). The media content may be generated by the content provider and then transmitted to a CDN node. The media content in the streaming server 110 may comprise an MPD and a plurality of segments. Note that, if desired, the MPD and the segments may be stored in different servers and sent to the streaming client from different servers. For example, an MPD may be sent to the source device 140 from the streaming server 110, while corresponding segments may be sent to the source device 140 from the streaming server 120, the streaming server 130, or both.

The network connections between the streaming servers 110-130, the source device 140, and the sink device 150 may be of any suitable type. For example, the source device 140 and the sink device 150 may belong to the same home network and be connected to the same wireless fidelity (WiFi) router. As a WiFi connection may be faster than a long distance Internet connection (e.g., between the streaming server 120 and the sink device 150), the sink device 150 may elect to stream some segment data from the source device 140 (where the segments are already available) instead of the streaming server 120.

Various potential use cases exist in the content delivery system 100, and embodiments disclosed herein may apply to any of the potential use cases. This disclosure describes a number of examplary use cases (Use Cases 1-4 and Tables 1-35), but it should be understood that these examples are non-limiting.

In Use Case 1, the source device 140 may first obtain an MPD from the streaming server 120. The source device 140 may read the MPD and obtain corresponding media segments from the streaming servers 110 and 130 based on the MPD. Then, the source device 140 may update the MPD, e.g., by storing or saving the MPD and the obtained segments as a single file. Details of how the MPD and the segments are saved as a single file or as associated files will be further described later. Accordingly, the sink device 150 may download the media content from the source device 140 by downloading the single file containing both MPD and segments.

Use Case 2 is similar to the Use Case 1, thus, in the interest of conciseness, further descriptions focus on aspects that are different (the same principle applies to other use cases). As the source device may have saved only part of the segments in some of the representations, some segments (e.g., belonging to another AdaptationSet or representation) may still be unavailable in the source device 140. In this case, instead of downloading the whole media content from the local source device 140, the sink device 150 may download some needed segments from the source device 140 and stream other segments from the streaming servers 110 and 130.

In Use Case 3, the sink device 150 may stream (instead of downloading as in Use Case 2) some segments from the source device 140, and stream other segments from the streaming servers 110 and 130. For example, while streaming segments (not of highest quality) from the source device 140, the sink device 150 may monitor its network conditions (e.g., bandwidth) between the sink device 150 and the streaming server 110 that has high-quality segments. Thus, the sink device 150 may determine that the network conditions allow the sink device 150 to stream segments that have the same time line as the packaged segments in source device 140 but have quality higher than the packaged segments. In this case, the sink device 150 may obtain the segments with higher quality from the streaming server 110. Otherwise, if the network conditions are relatively poor, the sink device 150 may continue to stream segments from the source device 140.

In Use Case 4, after obtaining the segments from the streaming servers 110 and 130 for the first time, the source device 140 may save the segments for future replay or playback. Suppose some segments obtained in the first time belong to high-quality representations, and the network condition worsens between the source device 140 and the streaming servers 110 and 130. The source device 140 may replay the media content using the previously obtained high-quality segments, thus improving user experience. Segments unavailable on the source device 140 (e.g., high-quality segments not previously saved) can still be obtained from the streaming servers 110 and 130. For another example, when the source device 140 streams a media content from the streaming server 110 during a first streaming session for playing the media content, a plurality of segments are received via streaming from the server 110. The source device 140 may store the segments (e.g., by packaging the MPD and segments). Later, if the source device 140 wishes to stream the same media content again, the stored segments may be retrieved by the source device 140 during a second streaming session for replaying the media content.

In an embodiment, the sink device 150 may be located in the proximity of the source device 140 storing segments, and the sink device 150 may be able to access and retrieve media segments from the source device 140. For example, a subscriber using the source device 140 retrieves a copy of a film (e.g., "Mission Impossible") by sink device 150 (e.g., a desktop). Later, a family member using the sink device 150 (e.g., a tablet) may retrieve the content from the desktop partially or entirely. Sometimes, the resolution of some of the segments may not be optimal, thus the sink device 150 may retrieve some segments from the desktop while retrieving other optimal segments from a remote content server such as the streaming server 110.

Figure 2:
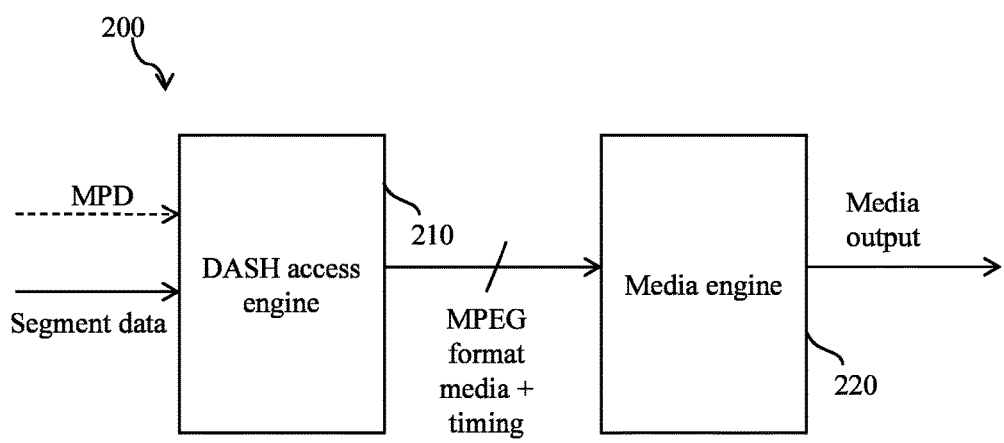
FIG. 2 is a schematic diagram of an embodiment of a client device.

FIG. 2 is a schematic diagram of an embodiment of a client device 200, which may be implemented in the system 100, e.g., as the source device 140 or the sink device 150. The client device 200 may send a request to a streaming server for a media content. In response, the streaming server may deliver an MPD to the client device 200. The MPD can be delivered using HTTP, email, thumb drive, broadcast, or any other transport. By parsing the MPD using a DASH access engine 210, the client device 200 may learn information regarding the media content, such as the timing of the program, the availability of media content, the media types, resolutions, minimum and maximum bandwidths, the existence of various encoded alternatives of multimedia components, the accessibility features and the required digital right management (DRM), the location of each media component on the network, and other characteristic of the media content.

The client device 200 may select the appropriate representation and start streaming of the media content by fetching segments using HTTP GET requests. Note that the client device 200 may download segments or segment data from a plurality of streaming servers, e.g., to maximize usage of network bandwidth. The client device 200 may render the downloaded media appropriately so as to provide streaming service to a user of the client device 200. Sometimes the segments may be stored in a local or nearby cache (e.g., in the source device 140, when the client is the sink device 150), so that the streaming may be more efficient. Segments may be decoded by a media engine 220 and played on the client device 200. Depending on network condition monitoring, the streaming client may adaptively adjust streaming to the available bandwidth by downloading segments of different representations (e.g., with a lower or higher bitrate) to maintain an adequate buffer.

FIG. 3 illustrates an examplary implementation 300 written in XML codes. One of ordinary skill in the art will understand the XML codes, thus following descriptions will focus on aspects relevant to the disclosed embodiments. In implementation 300, an MPD file contains segment data directly. Specifically, a "SegmentData" element is added to each element "Segment URL" in Representation. For example, "SegmentData" element 310 is added to Representation id=1 for audio, and "SegmentData" element 320 is added to Representation id=4 for video. The "SegmentData" elements 310 and 320 may directly contain data of corresponding segments. Thus, segments are distributed throughout the MPD file, that is, being stored in corresponding representation elements.

Since segments in Representations id=2 and id=3 may be unavailable in the client, Representations id=2 and id=3 can be obtained remotely from a streaming server, e.g., by using BaseURL elements 330 and 340, respectively. Note that, even though SegmentData elements 310 and 320 are available in the client, the client may still have the option to obtain them from the streaming server, e.g., by using BaseURL elements 312 and 322, respectively.

In alternative embodiments, instead of containing segment data directly in representations, the segment data may be associated with MPD by linkage or reference. FIG. 4 illustrates an examplary implementation 400 written in XML codes. One of ordinary skill in the art will understand similarities between the implementations 300 and 400 (same principle applies to other implementations). Thus, in the interest of conciseness, further descriptions focus on their differences. In implementation 400, both MPD and segment data belong to the same file. But instead of storing segment data directly in their representation elements as in implementation 300, implementation 400 may store or package segment data in a resource element 402 denoted as "Resources", which may reside at the beginning or the end of the file. As shown in FIG. 4, segment data 410 (denoted as SegmentData1) and segment data 420 (denoted as SegmentData 4) are stored in the "Resources" element in the beginning of the file.

Further, an element "SegmentData" is added to each corresponding representation in the MPD. For example, "SegmentData" element 430 is added to Representation id=1 for audio, and "SegmentData" element 440 is added to Representation id=4 for video. The elements 430 and 440 may not directly contain segments; instead, they may refer to the segment data contained in the "Resources" element 402. For example, the element 430 refers to segment data 410 by citing "SegmentData1", and the element 440 refers to segment data 420 by citing "SegmentData4".

Figure 5:
FIG. 5 illustrates yet another examplary implementation, in which a resource element is added to an MPD as a child element of the MPD.

FIG. 5 illustrates an examplary implementation 500 written in XML codes, in which a resource element 502 "Resources" is added to an MPD as a child element of the MPD (e.g., located at the end of the MPD). In the implementation 500, link or reference may be established by functionalities such as ID and IDREF, which are commonly used in XML. The attribute in element "SegmentData" of "Resources" may refer to the attribute "id" in "Representation" elements. The "id" attribute in representation element identifies the representation. For example, SegmentData element 510 contains an attribute "id1" that links or refers to attribute "id=1" in representation element 530, and SegmentData element 520 contains an attribute "id4" that refers to attribute "id=4" in representation element 540.

Figure 6:
FIG. 6 illustrates yet another examplary implementation, which adds a local uniform resource identifier (URI) element to each segment element.

FIG. 6 illustrates an examplary implementation 600, which adds a local uniform resource identifier (URI) element, denoted as "LocalURI", to each segment element in "Representation" of MPD. In the implementation 600, resource element 602 "Resources" is added to an MPD as a child element of the MPD (e.g., located at the end of the MPD). "Resources" element 602 may contain child element 610 "SegmentData" with "id=sid1" and child element 620 "SegmentData" with "id=sid4". "LocalURI" element 630 is associated to "Segmentdata" element 610 by the attribute "sid1" of the "SegmentData" element 610, while "LocalURI" element 640 is associated to "Segmentdata" element 620 by the attribute "sid1" of the "SegmentData" element 620.

FIG. 7 illustrates an examplary implementation 700, which may link stored segment data to corresponding segment elements by using XML features such as XLink, XPointer, or both. In the implementation 700, resource element 702 "Resources" is a child element of the MPD and comprises segment data 710 and 720. Further, segment data 710 is linked to corresponding segment element by XLink feature 730, and segment data 720 is linked to corresponding segment element by XLink feature 740.

FIG. 8 illustrates an examplary implementation 800, which may link stored segment data to corresponding segment elements by using full paths. In the implementation 800, resource element 802 "Resources" is a child element of the MPD and comprises segment data 810 and 820. Further, segment data 810 is linked to corresponding segment element by a path "Path=Resources/sid1" contained in a LocalURI element 830, and segment data 820 is linked to corresponding segment element by a path "Path=Resources/sid4" contained in a LocalURI element 840.

FIG. 9 illustrates an examplary implementation 900, which may generate an MPD extension. An original MPD 910 and an updated MPD 920 may be contained in the MPD extension. The original MPD 910 may be the MPD received from a streaming server, and its content is omitted for clarity. The updated MPD 920 may be one of the MPD mentioned in above implementations (e.g., implementation 300 is shown in updated MPD 920). A client device may parse the MPD extension and elect to use either the original MPD 910 or the updated MPD 920.

FIGS. 10A and 10B illustrate an examplary implementation 1000, which may package MPD and segment data as independent parts of a file, such as a Multipurpose Internet Mail Extensions (MIME) HyperText Markup Language (HTML) (MHTML) file. The file may be a multi-part message in MIME format. In an embodiment, the MPD is associated with segment data by URL and/or URI. For example, segment data 1010 is associated with segment element 1032 of an MPD 1030, and segment data 1020 is associated with segment element 1034 of the MPD 1030. Note that the segment data 1010 and 1020 are independently stored outside of the MPD 1030. Sequence of the multiple parts of the MHTML file is flexible.

FIG. 11 illustrates an examplary implementation 1100, which packages an MPD and segment data into a file. This file may not be a XML or MHTML file, but instead may be other types such as an executable file (e.g., with file extension type .exe), a compression file (e.g., with file extension type .zip or .rar). The file may contain a file header 1102, which may comprise a file type 1110 and a segment data description 1120. The file type 1110 may include an indicator (IND), which may indicate that this is a file packaging both MPD and segment data. The file type 1110 may further specify a Personal Media Suite (PMS) encoded file Header. The segment data description 1120 contains description information of segment data (SD_D), which comprises various information such as an unique identification of a current segment data (SD_id), corresponding period, AdaptationSet, and Representation (P, A, R) of the current segment data, an offset (SD_ofs) of the current segment data relative to a starting point, a length (SD 1) of the current segment data. An MPD 1130 is next to the file header 1102 and packaged segment data 1140, 1142, and 1144 may follow the MPD in a chronological order or time line.

FIG. 12 is a flowchart of an embodiment of a file processing method 1200, which may be implemented by a client device (e.g., the sink device 150 or the client device 200). In step 1202, the client device may receive, from another client device (e.g., the source device 140), a file described in implementation 1100. In step 1204, the client device may read the file type to determine that this is a file packing both MPD and segment data. In step 1206, the client device may determine an adaptation set and representation of the media content a user of the client device wants to get. Alternatively, here the client device can play the file according to the header information and skip all following steps.

In step 1208, the client device determines if the file contains such segment data according to query parameter SD_id and the (P,A,R) information. If there is the segment data in the file, in step 1210 the client device may retrieve the segment data from the file using the offset information SD_ofs and length information SD_l. Otherwise, if there is no such segment data in the file, in step 1212 the client device may retrieve the segment data from a remote content server using the MPD. Finally, in step 1214 the client device may decode the segment data.

FIGS. 13A and 13B illustrate an examplary implementation 1300, which may package or store an MPD and segment data as two separate files. Storing them as separate files may suit streaming, as the MPD and segment data may be streamed separately. The MPD may be extended and point to the corresponding entity in segment data using XPointer and XLink. As shown in FIG. 13A, assume that the name of an XML file 1310 storing the segment data is resources.xml. An MPD file 1320 in FIG. 13B may point to the XML file 1310 in FIG. 13A, e.g., using Xlink features 1322 and 1324 to link to segment data 1312 and 1314, respectively.

Figure 14:
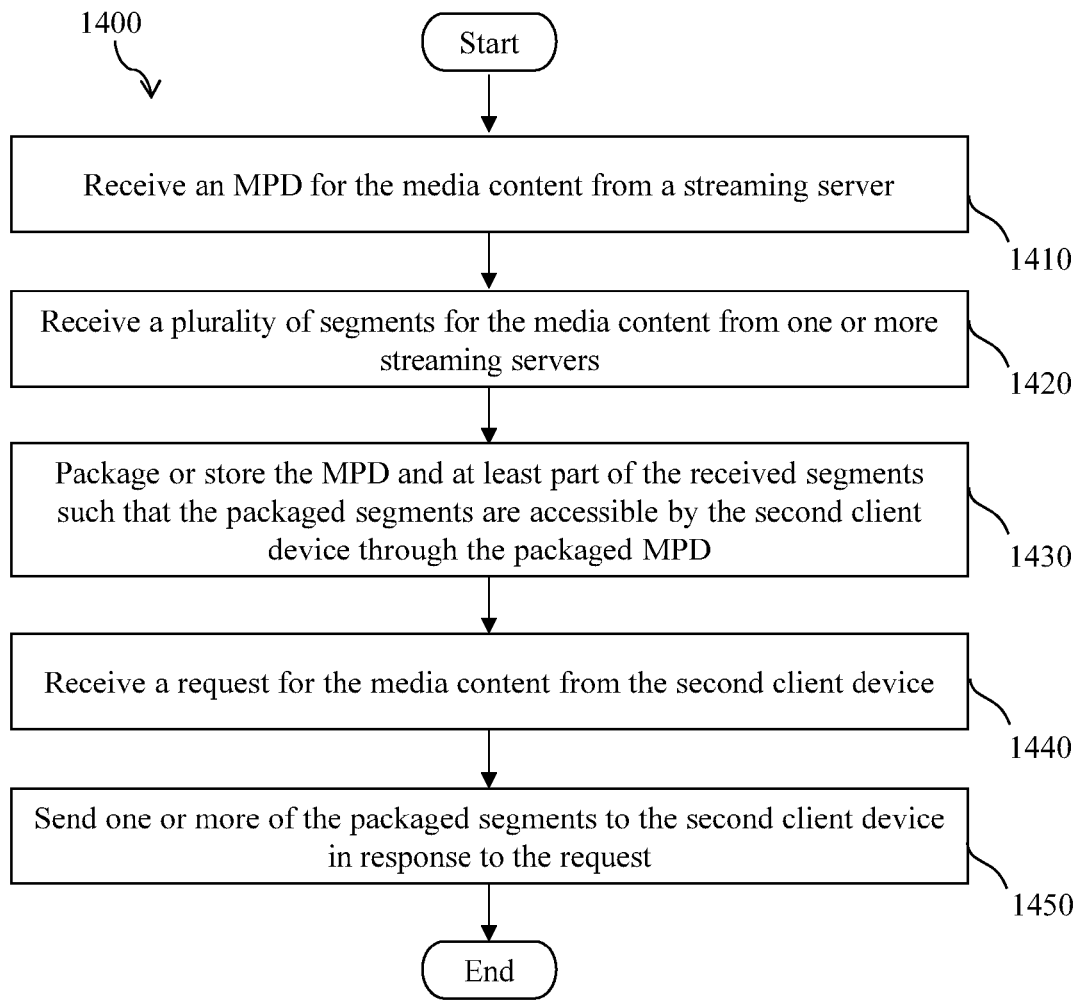
FIG. 14 is a flowchart of an embodiment of another method for processing a media content.

FIG. 14 is a flowchart of an embodiment of a method 1400, which may be implemented by a first client device (e.g., the source device 140, the sink device 150, or the client device 200). The method 1400 may enable the first client device to replay a media content using locally available media segments or to share the locally available media segments with a second client device.

The method 1400 starts in step 1410, where the first client device may receive an MPD for the media content from a streaming server. In step 1420, the first client device may further receive a plurality of segments for the media content from one or more streaming servers. Note that the segments and the MPD may be received from the same server or different servers. In step 1430, the client device may package or store the MPD and at least part of the received segments such that the packaged segments are accessible by the second client device through the packaged MPD. As described above (e.g., with respect to implementations 300-1100 and 1300), the segments or segment data may be packaged with the MPD in various approaches, including storing as a single file or as separate associated files. The first client device is coupled to the second client device via a network connection. The network connection may take any form such as a wired (e.g., Ethernet) or wireless (e.g., mobile or WiFi) connection.

In step 1440, the first client device may receive a request for the media content from the second client device. The request may be a downloading request or a streaming request. Further, the request may specify one or more segments, representations, adaptation set, and/or periods that the second client device wishes to retrieve. In step 1450, the first client device may send one or more of the packaged segments to the second client device in response to the request.

It should be understood that the method 1400 serves as an examplary embodiment, thus alternatives may be used to modify the method 1400 and additional steps may be incorporated as desired. For example, the first client device may play the media content for a first time using received segments only, but may replay the media content using at least some of the packaged segments. Further, the first client device may monitor network conditions (e.g., bandwidth) between the first client device and the one or more streaming servers during the replay, determine that the network conditions allow the first client device to stream segments that have the same time line as the packaged segments but have quality higher than the packaged segments, and obtain the segments with higher quality from the one or more streaming servers for the replay.

Figure 15:
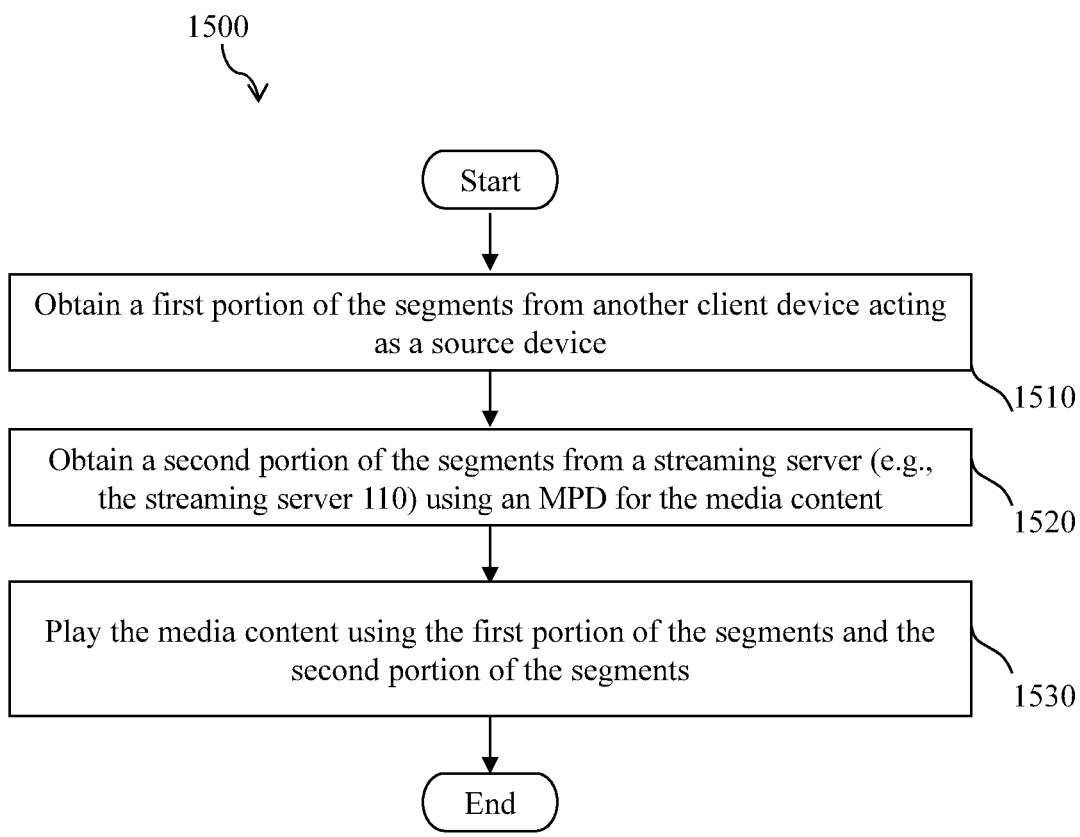
FIG. 15 is a flowchart of an embodiment of yet another method for obtaining and playing a media content.

FIG. 15 is a flowchart of an embodiment of a method 1500, which may be implemented by a client device (e.g., the sink device 150 or the client device 200) for obtaining a media content that comprises a plurality of segments. The first portion of the segments may be obtained from the source device as part of a packaged file. The method 1500 starts in step 1510, where the client device may obtain, via downloading or streaming, a first portion of the segments from a source device (e.g., the source device 140). The first portion of the segments may be obtained through an MPD stored in the source device. The MPD is for the same media content and may be packaged with the segments in various ways disclosed herein. In step 1520, the client device may obtain a second portion of the segments from a streaming server (e.g., the streaming server 110) using an MPD for the media content. The second portion may have better quality than the first portion or may not be available in the source device. In an embodiment, the client device may determine that the second portion of the segments is absent in the packaged file and then obtain the second portion of the segments. In step 1530, the client device may decode and play the media content using the first portion of the segments and the second portion of the segments.

It should be understood that the method 1500 serves as an examplary embodiment, thus additional steps may be incorporated as desired. For example, the first portion of the segments may be also available from the streaming server, thus the method 1500 may further determine that a first network connection between the client device and the source device is faster than a second network connection between the client device and the streaming server. Accordingly, obtaining the first portion of the segments from the source device may be based on the determination.

Additional use cases that were considered by Digital Entertainment Content Ecosystem (DECE) are summarized in Tables 1-35. One of ordinary skill in the art will recognize the context of these use cases and understand how to implement disclosed embodiments in them based on the title, problem statement, description, and preconditions of Tables 1-35. Please note that vendors, user names, user devices, content types, and other information used in Tables 1-35 are examplary and non-limiting.

TABLE 1

| | |
|---|---|
| Title | Changing streaming from Digital Living Network Alliance (DLNA) to Common Streaming Format (CSF) |
| Problem Statement | |
| Description | If quality of streaming from a DLNA device goes bad, a user may change content streaming from the DLNA device to CSF streaming from a Locker Access Streaming Provider (LASP). In this case, the DLNA device serves as an examplary streaming server, and the LASP serves as an exemplary source device. |
| Preconditions | |

TABLE 2

| | |
|---|---|
| Title | Changing from downloaded standard definition (SD) file playback to high definition (HD) CSF streaming |
| Problem Statement | When a user watches downloaded SD content, the user may want to watch HD CSF streaming from a LASP if his or her device supports enough network connectivity for CSF streaming. |

TABLE 2-continued

| | |
|---|---|
| Description | When a user watches downloaded SD content, the user continues to watch the same content of HD CSF streaming from a LASP. In this case, even though a media content has been downloaded and stored in a local memory, the user chooses to stream at least part of the media content from a streaming server nonetheless. |
| Preconditions | 1. Alice (examplary user) has downloaded a SD movie file (examplary content) on her Tablet (examplary client device).<br>2. The tablet can find a LASP for CSF streaming of a specific content. |

TABLE 3

| | |
|---|---|
| Title | Initiating (HD File) download while performing (SD) CSF streaming |
| Problem Statement | When streaming an SD content, a user may want to download HD version of the content for replay or later viewing. |
| Description | The user may store the SD content on the client device, but may still stream HD version of the content from the streaming server, if network conditions allow. |
| Preconditions | |

TABLE 4

| | |
|---|---|
| Title | Backfill for download |
| Problem Statement | Streamed files are generally tossed when not in use. If that is done, the resolution of some or all the segments may not be optimal. The streamed files may be saved for later use |
| Description | 1. Alice has purchased a movie, so the Rights token is in her procession (e.g., her locker).<br>2. Alice is streaming the movie to a DECE device.<br>3. Alice's bandwidth is sub-optimal. |
| Preconditions | |

TABLE 5

| | |
|---|---|
| Title | Social viewing |
| Problem Statement | |
| Description | Coordinator and player are able to sync (and keep in sync) streams on multiple playback devices across users/accounts. |
| Preconditions | 1. Alice and Bob both have Ultra-Violet (UV) accounts or Alice has a UV account and a guest pass that he provides to Bob.<br>2. Alice and Bob both have rights to movie Title X or Alice has rights to share his copy of Title X. |

TABLE 6

| | |
|---|---|
| Title | Clip sharing |
| Problem Statement | As the number of UV accounts, users, and titles increase, there will be extensive opportunities to socialize the viewing experience. Allowing users to share a chuck of the film provides numerous sell-through opportunities. |
| Description | Media player provides ability to "clip" content, and content URL provides instructions (start/end times, availability, etc.) for playback. |
| Preconditions | 1. Alice has a UV Account.<br>2. Alice has rights to movie Title X. |

TABLE 7

| | |
|---|---|
| Title | Adaptive playback |
| Problem Statement | As a user is watching a streaming content, connectivity to the Internet can vary as well as the processing capability of user device. The stream should adapt its delivery quality to accommodate variance in connectivity and processing capability. |
| Description | If connectivity improves, the user may stream higher-quality segments from a streaming server; otherwise the user may settle for lower-quality segments (from local memory or another client device). |
| Preconditions | 1. CSF stream provides for adaptive playback.<br>2. Alice has a device that can render CSF and connect to a LASP.<br>3. Alice has a UV Account, and has a LASP account.<br>4. Alice has purchased or rented the title. |

TABLE 8

| | |
|---|---|
| Title | Adaptive playback optimized for screen size |
| Problem Statement | Playing the highest bit-rate representation is not always in the interests of the streaming service provider. |
| Description | The service provider may determine a representation or its segments based on device parameters such as screen size (e.g., offer HD content to a HD television (HDTV) but SD content to a smartphone). |
| Preconditions | |

TABLE 9

| | |
|---|---|
| Title | Standardized quality of service (QoS) metrics from CSF capable devices |
| Problem Statement | |
| Description | Every device CSF certified must make available a standardized set of metrics around quality of playback. Whether these metrics are tracked and analyzed by an analytics service is up to the LASP. |
| Preconditions | |

TABLE 10

| | |
|---|---|
| Title | CSF specification is a subset of the DASH264 recommendation by the DASH Promoters Group |
| Problem Statement | |
| Description | |
| Preconditions | 1. The DASH264 recommendation is released by the DASH Promoters Group.<br>2. CSF definition is finalized. |

TABLE 11

| | |
|---|---|
| Title | Dynamic advertisement (ad) insertion |
| Problem Statement | |
| Description | A media player capable of communicating with ad servers and inserting ads at predefined points. |

TABLE 11-continued

| | |
|---|---|
| Pre-conditions | 1. Title selected by Alice has ad markup inserted at the content preparation stage.<br>2. Alice's device can connect to a LASP, and Alice has both an account at the LASP and a UV account. |

TABLE 12

| | |
|---|---|
| Title | Roaming |
| Problem Statement | A UV customer expects an ability to buy rights for streaming a title from retailer R, and stream it via LASP A (when connected using cable provider in Boston), and LASP B (when connectedvia a wireless operator in London). |
| Description | Alice is able to stream the title she owns or rents via the LASP of her choice. In addition to her regular charges, a LASP may bill Alice for roaming. |
| Pre-conditions | 1. Alice's TV and tablet can connect to different LASP's.<br>2. Alice has a UV Account, and has an LASP A account.<br>3. Alice has purchased or rented the title. |

TABLE 13

| | |
|---|---|
| Title | Live broadcast and cloud digital video recording (DVR) |
| Problem Statement | A UV customer expects an ability to buy rights for any type of content. Streaming gives an opportunity for retailers and LASP's to provide portable rights for live broadcasts. |
| Description | Alice, a hard-core football fan, purchases rights for viewing all World Cup games. She is able to view these on her 100" Ultra HD 3D TV via the LASP of her choice. |
| Pre-conditions | |

TABLE 14

| | |
|---|---|
| Title | DRM support |
| Problem Statement | |
| Description | Low-complexity transforms between different DRMs (e.g., transforming a file (with media segments) supported by a first-generation DRM software to a file supported by a second-generation DRM software). |
| Pre-conditions | |

TABLE 15

| | |
|---|---|
| Title | Changing Content Components |
| Problem Statement | Several UV customers are watching the same content. They have different mother tongues, and expect to be able to see subtitles and/or dubbing into their languages. |
| Description | Display, overlay, and switch between different auxiliary components during the streaming session. |
| Pre-conditions | 1. Alice's device can connect to different LASP's.<br>2. Alice's device is able to display several subtitles simultaneously.<br>3. Alice has a UV Account and possibly an account with a LASP.<br>4. Alice purchased viewing rights at her favorite retailer. |

TABLE 16

| | |
|---|---|
| Title | Emergency alerts |
| Problem Statement | Multiple System Operators (MSOs) are required to notify viewers in case of a natural or man-made emergency. Same functionality would be expected from LASP's. |

TABLE 16-continued

| | |
|---|---|
| Description | Forcing display of audiovisual or/and textual content different from the one requested by the customer. |
| Pre-conditions | 1. Alice's devices can connect to a LASP. |

TABLE 17

| | |
|---|---|
| Title | Blackouts |
| Problem Statement | Laws (e.g. Canadian elections) and rights agreements prevent broadcasters from displaying certain content in some areas or markets. E.g., football games often cannot be shown within 75 miles from the stadium. |
| Description | Disabling display of live content by geographical location. |
| Pre-conditions | 1. Alice's and Bob's devices can connect to a LASP. |

TABLE 18

| | |
|---|---|
| Title | Permitting collection of usage data and opinion information |
| Problem Statement | |
| Description | LASP provides generic services as well as additional services to subscribers who are willing to provide usage information feedback based on their permission at the streaming content level. |
| Pre-conditions | 1. Alice's Device is able to gather usage data and opinion information and provides them back to LASP.<br>2. Alice understands that by providing the feedback and she can get customized and additional services.<br>3. Alice has already purchased a movie. |

TABLE 19

| | |
|---|---|
| Title | Additional interactive content |
| Problem Statement | |
| Description | LASP provides this value-added service based on user's subscription. |
| Pre-conditions | 1. LASP can provide interactive value-added services, as described above.<br>2. Alice is subscribed to these services from the LASP.<br>3. Alice has purchased a content that comes with additional content components to interact with. |

TABLE 20

| | |
|---|---|
| Title | Personalized prescheduled advertisements |
| Problem Statement | |
| Description | LASP provides a streaming service that can be personalized with prescheduled advertisement support. |
| Pre-conditions | 1. Alice has registered an account at the LASP.<br>2. LASP can provide content service with/without advertisement. |

TABLE 21

| | |
|---|---|
| Title | Mosaic |
| Problem Statement | |
| Description | LASP provides concurrent views of a same event or concurrent multiple events for subscribers to choose and switch. |
| Pre-conditions | 1. Alice has a UV account and possible account with a LASP.<br>2. LASP can provide concurrent views of a same event or concurrent multiple events. |

TABLE 22

| | |
|---|---|
| Title | Trick Modes |
| Problem Statement | Subscriber may take breaks during watching a movie streaming. Then the subscriber continues watching the movie. A consumer may also want to jump within a movie. |
| Description | The subscriber is able to pause and resume content playback. |
| Pre-conditions | 1. Alice has a UV account and possibly an account at the LASP.<br>2. The LASP provides the trick mode functionality. |

TABLE 23

| | |
|---|---|
| Title | Device switching from one to another |
| Problem Statement | A subscriber can watch content first on one device, and then continue watching the same content on another device. |
| Description | A subscriber may watch content on different devices. |
| Pre-conditions | 1. Alice has registered two devices in her account.<br>2. The LASP provides the service like device-switching mentioned above. |

TABLE 24

| | |
|---|---|
| Title | Device switching by adding a new one |
| Problem Statement | Subscribers and their family members may first watch streaming content on a single device (e.g., a TV), and later on each one of them continues watching the same content on different devices. |
| Description | Alice and her husband watch a movie on TV at home together. Then Alice has to leave. Her husband stays at home and continues watching that movie, while Alice watches that movie using her mobile device. |
| Pre-conditions | 1. Alice has registered multiple devices in her account.<br>2. The LASP provides the service like one movie to two users who share one DECE account. |

TABLE 25

| | |
|---|---|
| Title | Device switching from one device to two or more devices |
| Problem Statement | Subscribers and their family members may first watch streaming content on a single device (e.g., a TV), and later on each one of them continues watching the same content on different devices. |
| Description | Alice and her daughter watch a movie on TV at home together. Now, it's time to sleep. They turn off tthe TV, go into heir own bedrooms, and continue watching the movie separately using other two devices. |
| Pre-conditions | 1. Alice has registered multiple devices in her account.<br>2. The LASP provides the service like switching from one device to other devices. |

TABLE 26

| | |
|---|---|
| Title | Family members watch different versions of same content at different times |
| Problem Statement | |
| Description | Alice wants to watch a movie together with her daughter. They first watch a PG-13 version. After her daughter goes to bed, Alice switches to an R-rated version which may require additional authentication. |
| Pre-conditions | 1. Alice has registered her TV in her UV account, with her profiles (including her age).<br>2. The LASP provides streaming content in differently rated versions. |

TABLE 27

| | |
|---|---|
| Title | Family members watch different versions of same content at differentpaces |
| Problem Statement | |
| Description | A home server device may act as a source device, while other client devices in the home can act as sink devices to get contents from the homeserver. |
| Pre-conditions | 1. Alice and her family members have registered their devices to a same home domain.<br>2. LASP provides a home server device to further stream content to home devices. |

TABLE 28

| | |
|---|---|
| Title | Device-based efficient track selection |
| Problem Statement | We wish to completely avoid sending multiple audio or video tracks to the client, and efficiently only send the necessary or desired track. |
| Description | The client communicates with the server the capabilities of playback - for example, the client device signals that it can decode a multichannel soundtrack. The server delivers only the appropriate audio track as requested. |
| Pre-conditions | 1. Aria has purchased a movie, the rights token is in his locker.<br>2. Aria is streaming the movie to a DECE device. |

TABLE 29

| | |
|---|---|
| Title | User-based efficient tack selection |
| Problem Statement | We wish to completely avoid sending multiple audio or video tracks to the client, and efficiently only send the necessary or desired track. |
| Description | The movie hosted on the server has multiple audio or video tracks, and we wish to only send the appropriate track to the client. In this case, the consumer explicitly chooses which track to deliver, for example choosing between languages or between multiple audio choices (such as commentary tracks). The server delivers only the appropriate audio track as requested. |
| Pre-conditions | 1. Aria has purchased a movie, the Rights token is in his locker.<br>2. Aria is streaming the movie to a DECE device.<br>3. The movie has multiple audio or video tracks. |

TABLE 30

| | |
|---|---|
| Title | DASH compliance |
| Problem Statement | Many device manufacturers are implementing DASH support in media players. These players should be capable of playing CSF streams. If device manufacturers must modify their DASH implementations to support CSF, the CSF is unlikely to have a CSF large device footprint. Therefore streams should be DASH-compliant. It is understood that CSF client applications will need UV application logic to support UV policies at the application layer. |
| Description | A media player built to comply with the ISOFF DASH formats is capable of playing CSF streams. |
| Pre-conditions | 1. Alice's device has a media player compliant with MPEG DASH ISO base media file formats ("On Demand" and "Live").<br>2. Alice's device can connect to a LASP, and Alice has both an account at the LASP and a UV Account. |

TABLE 31

| | |
|---|---|
| Title | Second Screen scenario |
| Problem Statement | UV Content is played on two players. While one player (player A) presents main part of the UV title, the other player (player B) presents an additional related part of the UV title, such as a subtitle or audio track. |

TABLE 31-continued

| | |
|---|---|
| Description | Two media players on two separate physical devices are used simultaneously to provide better user experience. |
| Preconditions | |

TABLE 32

| | |
|---|---|
| Title | Adaptive video and audio |
| Problem Statement | |
| Description | 1. CSF stream provides for adaptive playback.<br>2. Aria has a Device that can render CSF and connect to a LASP.<br>3. Aria has purchased or rented a UV title. |
| Preconditions | |

TABLE 33

| | |
|---|---|
| Title | UV streaming services and clients |
| Problem Statement | |
| Description | Enable consumers to use any UV streaming device to playback their UV content from any UV streaming service (retailer/LASP) that has an Over-The-Top (OTT) offering. |
| Preconditions | |

TABLE 34

| | |
|---|---|
| Title | Initiate stream ("watch now") from the UV web portal |
| Problem Statement | Consumers, authenticated with the Coordinator, can initiate a download of a purchased title from the UV Web Portal, but they cannot initiate a stream. |
| Description | Enable consumers to select "watch now" from the UV web portal, which will initiate a stream in the CSF from the originating retailer. |
| Preconditions | 1. Alice and John are members of a UV account with multiple rights tokens.<br>2. John has linked accounts with VUDU, while Alice does not. |

TABLE 35

| | |
|---|---|
| Title | Publishing UV download and CSF adaptive streaming assets |
| Problem Statement | Tools and workflows do not exist for preparing and packaging Common File Format (CFF) files used for CSF adaptive bitrate streaming. |
| Description | Allow download assets and CSF assets to encoded and encrypted by the same encoders and part of the same automated workflow. |
| Preconditions | 1. Alice and John are members of a UV account with multiple rights tokens.<br>2. John has linked accounts with VUDU, while Alice does not. |

Figure 16:
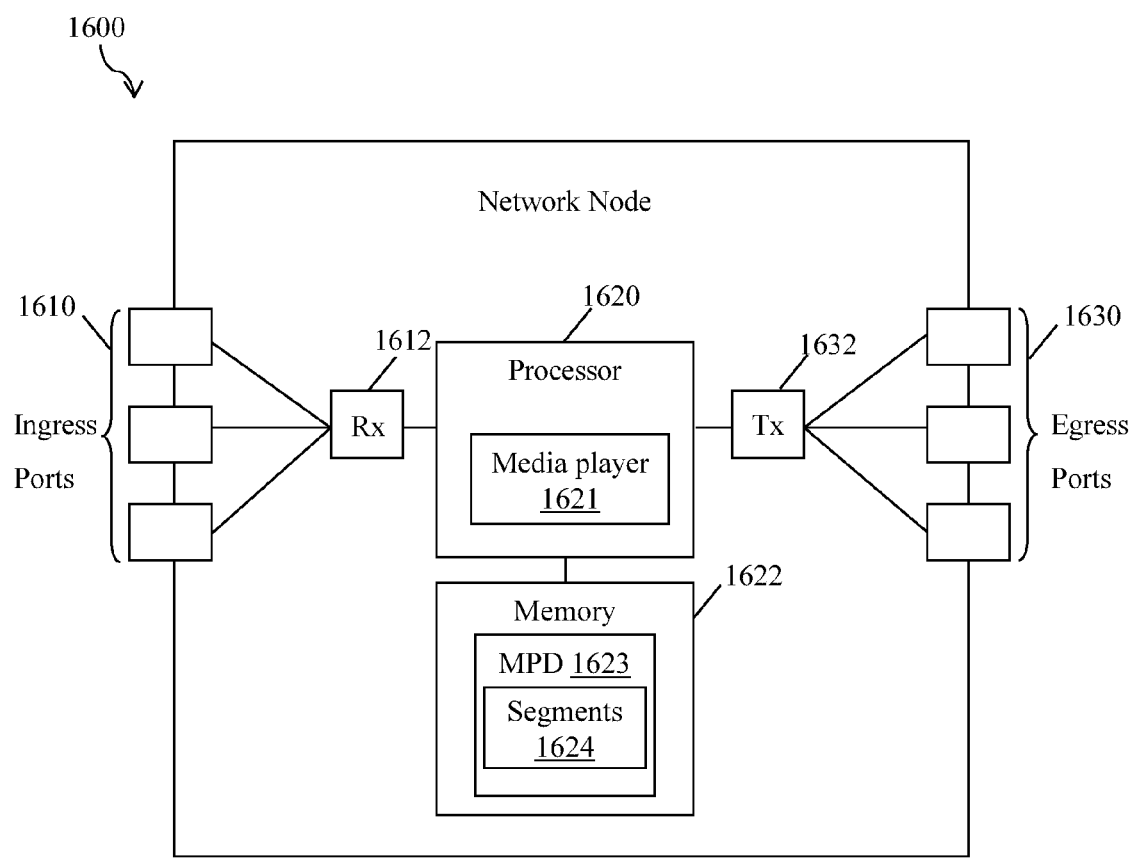
FIG. 16 is a schematic diagram of an embodiment of a network device.

FIG. 16 is a schematic diagram of an embodiment of a computer system or network device 1600. The network device 1600 may be implemented as any suitable device, such as a streaming server (e.g., the streaming server 110, 120, or 130) disclosed herein or a client device (e.g., the source device 140, the sink device 150, or the client device 200). The network device 1600 should be capable of receiving, processing, and transmitting messages such as media requests and segments to and from a network. The network device 1600 may comprise one or more ingress ports 1610 coupled to a receiver 1612 (Rx), which may be configured for receiving MPD and/or segments from other network components. The network device 1600 may further comprise one or more egress ports 1630 coupled to a transmitter (Tx) 1632, which may be configured for transmitting MPD and/or segments to other network components. The network device 1600 may further comprise a logic unit or processor 1620 coupled to the receiver 1612 and configured to process the segments or otherwise determine to which network components to send the segments.

The processor 1620 may be implemented using hardware or a combination of hardware and software. The processor 1620 may be implemented as one or more central processor unit (CPU) chips, cores (e.g., a multi-core processor), field-programmable gate arrays (FPGAs), application specific integrated circuits (ASICs), and/or digital signal processors (DSPs). The processor 1620 may be configured to implement any of the functional modules or units described herein, such as the DASH access engine 210, the media engine 220, a media player 1621, or any other functional component known by one of ordinary skill in the art, or any combinations thereof. The media player 1621 may be an application running on the processor 1620 and configured to play decoded media segments.

The network device 1600 may further comprise at least one memory 1622. The memory 1622 may be configured to store an MPD 1623 and segments 1624. The MPD 1623 and the segments 1624 may be stored or packed in various forms as described above. For example, as shown in FIG. 16, the segments 1624 are contained in the MPD file 1623.

In practice, there may be bidirectional traffic processed by the network device 1600, thus some ports may both receive and transmit packets (e.g., segments). In this sense, the ingress ports 1610 and egress ports 1630 may be co-located or may be considered different functionalities of the same ports that are coupled to transceivers (Rx/Tx). One of more of the processor 1620, the memory 1622, the receiver 1612, and the transmitter 1632 may also be configured to at least partially implement or support any of the methods and implementations described above, such as the implementations 300-1100, the file processing method 1200, the implementation 1300, and the methods 1400 and 1500.

It is understood that, by programming and/or loading executable instructions onto the network device 1600, at least one of the processor 1620 and the memory 1622 can be changed. As a result, the network device 1600 may be transformed in part into a particular machine or apparatus (e.g. a network router having the functionality taught by the present disclosure). The executable instructions may be stored on the memory 1622 and loaded into the processor 1620 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and random access memory (RAM)). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a first client device, the method comprising:
receiving a media presentation description (MPD) for a media content from a streaming server;
receiving a plurality of segments for the media content from one or more streaming servers;
storing the MPD and the plurality of segments for the media content;
creating an MPD extension according to the segments for the media content currently stored by the first client device;
packaging the MPD, the MPD extension, and at least part of the received segments into a packaged MPD such that the packaged segments are accessible by a second client device through the packaged MPD;
receiving a request from the second client device for the media content; and
sending the packaged MPD from the first client device to the second client device in response to the request; and
sending at least a portion of the packaged segments to the second client device.

2. The method of claim 1, wherein the first client device is coupled to the second client device via a network connection.

3. The method of claim 2, wherein the request is a downloading request, and wherein the method further comprises sending the packaged MPD together with the packaged segments as a single file to the second client device.

4. The method of claim 2, wherein the request is a streaming request, and wherein the method further comprises sending the packaged MPD with the packaged segments as separate and associated files to the second client device.

5. The method of claim 1, further comprising:
playing the media content for a first time using the received segments; and
replaying the media content using at least some of the packaged segments.

6. The method of claim 5, further comprising:
monitoring network conditions between the first client device and the one or more streaming servers during the replay;
determining that the network conditions allow the first client device to stream segments with a same time line as the packaged segments but have quality higher than the packaged segments; and
obtaining the segments with higher quality from the one or more streaming servers for the replay.

7. The method of claim 5, further comprising:
monitoring network conditions between the first client device and the one or more streaming servers during the replay; and
determining that the network conditions do not allow the first client device to stream, from the one or more streaming servers, segments with a same time line as the packaged segments but have quality higher than the at least some of the packaged segments,
wherein the at least some of the packaged segments are used during the replay based on the determination that the network conditions do not allow the first client device to stream the at least some of the packaged segments.

8. The method of claim 1, wherein the received MPD and the at least part of the received segments are packaged as one file, and wherein a packaged segment is accessible by the second client device through a corresponding element of the packaged MPD.

9. The method of claim 8, wherein the file is an MPD file written in extensible markup language (XML), wherein the MPD file comprises the packaged segments as segment data (SegmentData) elements, and wherein the SegmentData elements are stored in corresponding representation elements of the MPD file.

10. The method of claim 8, wherein the received segments are packaged in a resource element at a beginning or an end of the file, and wherein the MPD comprises segment data (SegmentData) elements that refer to corresponding packaged segments in the resource element.

11. The method of claim 8, wherein the file is an MPD file comprising a resource element, and wherein the resource element comprises the packaged segments and representation identifiers that link to corresponding representation elements of the MPD file.

12. The method of claim 8, wherein the file is an MPD file comprising a resource element, wherein the resource element comprises the packaged segments and corresponding local uniform resource identifiers (URIs), and wherein the local URIs link the packaged segments to corresponding segment elements of the MPD file.

13. The method of claim 8, wherein the file is an MPD file comprising a resource element, wherein the resource element comprises the packaged segments, and wherein the packaged segments are linked to corresponding segment elements of the MPD file using at least one of XLink and XPointer features.

14. The method of claim 8, wherein the file is an MPD file comprising a resource element, wherein the resource element comprises the packaged segments, and wherein the packaged segments are linked to corresponding segment elements of the MPD file using a path contained in each corresponding segment element.

15. The method of claim 8, wherein the file is the MPD extension comprising the received MPD and an updated MPD, and wherein the updated MPD comprises the packaged segments.

16. The method of claim 8, wherein the file is a Multi-purpose Internet Mail Extensions (MIME) HyperText Markup Language (HTML) (MHTML) file, and wherein the packaged MPD is associated with the packaged segments by uniform resource identifiers (URIs) in the MHTML file.

17. The method of claim 8, wherein the file comprises a file header followed by the packaged MPD and the packaged segments, and wherein the file header specifies that the file contains the packaged MPD and the packaged segments.

18. The method of claim 1, wherein the MPD and the at least part of the received segments are packaged as separate extensible markup language (XML) files and associated through XML features.

19. An apparatus comprising:
a receiver configured to receive a media presentation description (MPD) that describes a media content and a plurality of segments for the media content during a first streaming session, wherein the MPD is received from a streaming server, and wherein the plurality of segments are received from one or more streaming servers;
a processor coupled to the receiver and configured to execute instructions to play the media content using the received segments during the first streaming session; and
a memory coupled to the processor and configured to store the MPD and at least part of the received segments, wherein each of the stored segments is retrievable through the stored MPD,
wherein the processor is further configured to execute instructions to:
monitor a network condition between the receiver and the streaming server;
determine that the network condition allows the receiver to receive a subset of segments for the media content from the streaming server, wherein the subsets of segments for the media content correspond to the stored segments but are at a higher quality than the stored segments;
replay the media content using at least some of the stored segments and the subset of segments received during a second streaming session.

20. The apparatus of claim 19, wherein the receiver is further configured to receive a request for the media content from a media streaming client, wherein the processor is further configured to retrieve the at least one of the stored segments based on the request, and wherein the apparatus further comprises a transmitter coupled to the processor and configured to transmit the retrieved segments to the media streaming client.

21. The apparatus of claim 20, wherein the MPD and at least part of the received segments are stored as separate and associated extensible markup language (XML) files, and wherein the retrieved segments are transmitted to the media streaming client via streaming.

22. The apparatus of claim 20, wherein the MPD and at least part of the received segments are stored as a single file, and wherein the retrieved segments are transmitted to the media streaming client via downloading.

23. A method implemented by a second client device for obtaining a media content that comprises a plurality of segments, the method comprising:
- receiving a media presentation description (MPD) from a first client device;
- obtaining a first portion of the segments from the first client device acting as a source device, wherein the first portion of the segments is obtained using the MPD received from the first client device;
- obtaining a second portion of the segments from a streaming server; and
- playing the media content using the first portion of the segments and the second portion of the segments.

24. The method of claim 23, wherein the first portion of the segments is obtained from the source device as part of a packaged file that also contains the MPD, wherein the method further comprises determining that the second portion of the segments is absent in the packaged file, and wherein the second portion of the segments is obtained from the streaming server by using another version of the MPD for the media content.

25. The method of claim 23, wherein the first portion of the segments is also available from the streaming server, wherein the method further comprises determining that a first network connection between the second client device and the source device is faster than a second network connection between the second client device and the streaming server, and wherein obtaining the first portion of the segments from the source device is based on the determination that the first network connection is faster.

* * * * *